United States Patent [19]

Silverberg

[11] 4,368,973

[45] Jan. 18, 1983

[54] RECIRCULATING DOCUMENT FEEDER

[75] Inventor: Morton Silverberg, Penfield, N.Y.

[73] Assignee: Xerox Corporation, Stamford, Conn.

[21] Appl. No.: 223,538

[22] Filed: Jan. 8, 1981

[51] Int. Cl.³ .................. G03G 15/04; B65H 1/30; B65H 3/12; B65H 31/08
[52] U.S. Cl. .................. 355/3 SH; 271/3.1; 271/5; 271/94; 271/98; 271/186; 271/197; 271/212
[58] Field of Search ............. 271/3.1, 212, 94, 95, 271/96, 98, 4, 5, 6, 7, 3, 65, 186, 211, 213, 34, 160, 117, 197, 195, 200, 276, 147, 157; 355/3 SH, 14 SH, 75, 76; 414/32, 33, 34, 92, 93, 94, 95, 96

[56] References Cited

U.S. PATENT DOCUMENTS

| | | |
|---|---|---|
| 2,987,314 | 6/1961 | Monaghan ............... 271/212 X |
| 3,030,867 | 4/1962 | Wright ....................... 414/96 X |
| 3,702,697 | 11/1972 | Leutwein et al. ............ 271/3 |
| 3,799,537 | 3/1974 | Cobb ............................ 271/3 |
| 3,871,539 | 3/1975 | Nikkel ....................... 271/212 X |
| 3,947,018 | 3/1976 | Stange ....................... 271/211 X |
| 3,949,979 | 4/1976 | Taylor et al. ............... 271/117 X |
| 4,073,787 | 3/1978 | Burlew et al. ............... 271/3.1 |
| 4,076,408 | 2/1978 | Reid et al. ................... 355/14 |
| 4,099,150 | 7/1978 | Connin ...................... 271/3.1 X |
| 4,153,500 | 6/1979 | DiFrancesco et al. ...... 271/3.1 X |
| 4,169,674 | 10/1979 | Russel ......................... 271/3.1 X |
| 4,176,945 | 12/1979 | Holzhauser et al. ......... 271/65 X |
| 4,179,215 | 12/1979 | Hage ........................... 271/4 X |
| 4,189,136 | 2/1980 | Robinette ................... 271/157 X |
| 4,278,344 | 7/1981 | Sahay ......................... 271/3.1 X |

FOREIGN PATENT DOCUMENTS 20973 1/1981 European Pat. Off. ............ 271/212

OTHER PUBLICATIONS

Anderson, T. H. et al. "Document Feeder and Separator," IBM Tech. Disc. Bull. vol. 6, No. 2, 1963. pp. 32–33.
Roller, D. C. "Recirculating Automatic Document Feeder," IBM Tech. Disc. Bull., vol. 22, No. 6, Nov. 1979, pp. 2228–2229.

Primary Examiner—Bruce H. Stoner, Jr.
Attorney, Agent, or Firm—H. Fleischer; J. E. Beck; R. Zibelli

[57] ABSTRACT

An apparatus which moves documents in a recirculating path from a stack to an imaging station. Successive uppermost document are fed from the stack to the imaging station. After imaging, the documents are returned to the bottom of the stack.

12 Claims, 6 Drawing Figures

RECIRCULATING DOCUMENT FEEDER

The present invention relates generally to an electrophotographic printing machine, and more particularly concerns an improved document handling unit for providing recirculating pre-collation copying of original documents.

Generally, an electrophotographic printing machine includes a photoconductive member which is charged to a substantially uniform potential to sensitize the surface thereof. The charged portion of the photoconductive surface is exposed to a light image of an original document being reproduced. This records an electrostatic latent image on the photoconductive member corresponding to the informational area contained within the original document. After the electrostatic latent image is recorded on the photoconductive member, a developer mix is brought into contact therewith. This forms a powder image on the photoconductive member which is subsequently transferred to a copy sheet. Finally, the copy sheet is heated to permanently affix the powder image thereto in image configuration.

As electrophotographic printing machines increase in speed and become highly automated, the automatic handling of the documents being copied becomes more and more significant. Not only must the document handling unit be capable of handling original documents having information on only one side thereof, i.e. simplex copying, but they must also be capable of handling documents having information on both sides thereof, i.e. duplex sheets. Generally, the document handling unit makes pre-collation copying feasible. In pre-collation copying, any desired number of pre-collated copy sets may be made by making a corresponding number of recirculations of the documents in collated order past the imaging station and reproducing each document as it is recirculated. Various approaches have been devised to improve document handling units. The following disclosures appear to be relevant:

U.S. Pat. No. 3,799,537; Patentee: Cobb; Issued: Mar. 26, 1974.

U.S. Pat. No. 3,947,018; Patentee: Stange; Issued: Mar. 30, 1976.

U.S. Pat. No. 4,076,408; Patentee: Reid et al.; Issued: Feb. 28, 1978.

U.S. Pat. No. 4,078,787; Patentee: Burlew et al.; Issued: Mar. 14, 1978.

U.S. Pat. No. 4,099,150; Patentee: Connin; Issued: July 4, 1978.

U.S. Pat. No. 4,158,500; Patentee: DiFrancesco et al.; Issued: June 19, 1979.

U.S. Pat. No. 4,169,674; Patentee: Russel; Issued: Oct. 2, 1979.

U.S. Pat. No. 4,176,945; Patentee: Holzhauser et al.; Issued: Dec. 4, 1979.

U.S. Pat. No. 4,179,215; Patentee: Hage; Issued: Dec. 18, 1979.

The pertinent portions of the foregoing disclosures may be briefly summarized as follows:

Cobb discloses a document feeding system in which each original document is placed in a carrier. The documents in the carrier are then positioned in a rack adjacent the exposure window of the copier. The documents are arranged in the rack with the first page topmost and the last page bottommost. A reciprocating pick-up arm removes the topmost document from the rack to the exposure window of the copier. After being reproduced, the pick-up arm returns the first original document to the bottom of the stack and removes the second document for copying.

Stange describes a vacuum roller for removing bottom sheets from a stack or inserting sheets at the bottom of a stack of sheets.

Reid et al., Burlew et al., Connin, DiFrancesco et al., Russel, Holzhauser et al. and Hage disclose document recirculating units in which successive documents are withdrawn from the bottom of a stack of documents, advanced over the exposure platen of a printing machine and returned to the top of a document stack.

In accordance with the present invention, there is provided an apparatus for moving documents in a recirculating path from a stack to an imaging station. The apparatus includes means for supporting the stack. Means are provided for feeding successive uppermost documents from the stack. The supporting means and feed means are movable relative to one another to locate automatically successive uppermost documents of the stack closely adjacent to the feeding means. Means transport documents from the feeding means to the imaging station and return the documents to the bottom of the stack on the supporting means.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
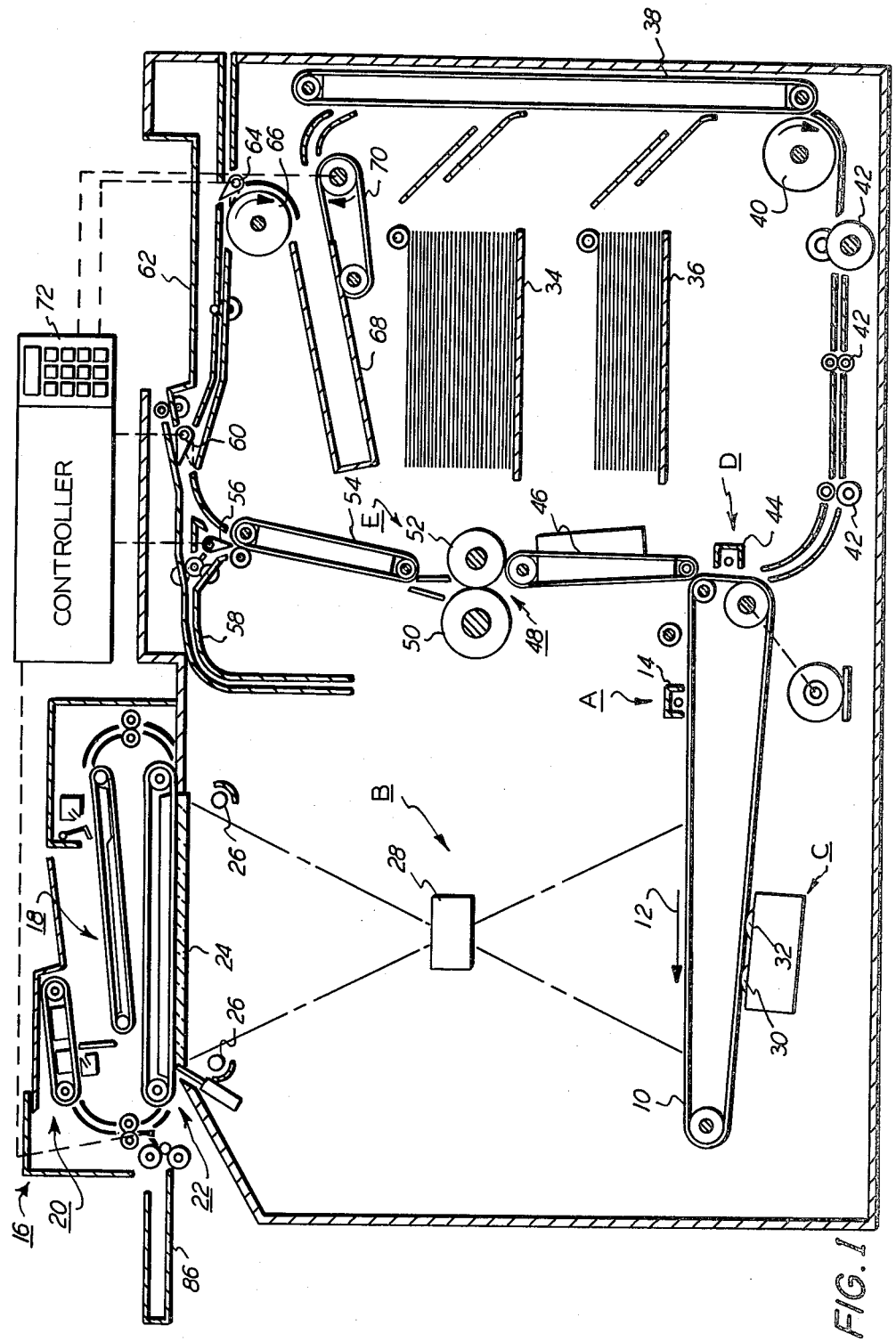
FIG. 1 is a schematic elevational view of an electrophotographic printing machine incorporating the features of the present invention therein.

For a general understanding of the features of the present invention reference is had to the drawings. In the drawings, like reference numerals have been used throughout to designate identical elements. FIG. 1 schematically depicts the various components of an illustrative electrophotographic printing machine incorporating the document handling unit of the present invention therein. It will become apparent from the following discussion that the document handling unit is equally well suited for use in a wide variety of electrostatographic printing machines and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the illustrative electrophotographic printing machine employs a belt 10 having a photoconductive surface. Preferably, the photoconductive surface comprises a transport layer containing a small molecule dispersed in an organic resinous material and a generation layer having trigonal selenium dispersed in a resinous material. Belt 10 moves in the direction of arrow 12 to advance successive portions of the photoconductive surface sequentially through the various processing stations disposed about the path of movement thereof.

Initially, a portion of the photoconductive surface passes through charging station A. At charging station A, a corona generating device, indicated generally by the reference numeral 14, charges the photoconductive surface to a relative high substantially uniform potential.

Next, the charged portion of the photoconductive surface is advanced to imaging station B. Imaging station B includes the document handling unit of the present invention, indicated generally by the reference numeral 16. Document handling unit 16 sequentially feeds successive original documents from a stack of original documents placed by the operator faceup in the normal forward collated order on the document handling and supporting vacuum belt system, indicated generally by the reference numeral 18. The uppermost sheet of the stack of documents is positioned closely adjacent to the vacuum belt feeder 20. Vacuum belt feeder 20 advances the topmost sheet from the stack to vacuum belt transport 22. Vacuum belt transport 22 advances the original document to platen 24. At platen 24, the original document is positioned facedown. Lamps 26 illuminate the original document on transparent platen 24. The light rays reflected from the original document are transmitted through lens 28. Lens 28 forms a light image of the original document which is projected onto the charged portion of the photoconductive surface of belt 10 to selectively dissipate the charge thereon. This records an electrostatic latent image on the photoconductive surface which corresponds to the informational areas contained within the original document. Vacuum belt transport 22 then returns the imaged document to the bottom of the stack of documents supported on vacuum belt support 18. It is thus clear that the vacuum belt feeder advances the uppermost document through a natural inverting path of the platen for imaging. Thereafter, the vacuum belt transport moves the imaged document through a natural inverting path to the bottom of the stack. A document handling unit of this type provides for 1-N operation. The unit controls restacking. Since a top document feeder/separator is employed, the unit is less constrained and more reliable. The detailed structure and operation of document handling unit 16 will be described hereinafter with reference to FIGS. 2 through 6, inclusive.

After imaging, belt 10 advances the electrostatic latent image recorder on the photoconductive surface to development station C. At development station C, a pair of magnetic brush developer rollers 30 and 32 advance developer material into contact with the electrostatic latent image. Toner particles are deposited on the photoconductive surface in image configuration. Belt 10 then advances the power image to transfer station D.

At transfer station D, a copy sheet is moved into contact with the powder image. Copy sheets are fed from a selected tray 34 or 36 to transfer station D for transferring the toner powder image to the first side of the copy sheet. Conveyor 38 advances the copy sheet around roller 40 through feed rollers 32 to transfer station D. At transfer station D, a corona generating device 44 sprays ions onto the backside of the sheet. This attracts the powder image from the photoconductive surface to the copy sheet. After transfer, the copy sheet is advanced by conveyor 46 to fusing station E.

Fusing station E includes a fuser assembly, indicated generally by the reference numeral 48, which permanently affixes the transferred toner powder image to the copy sheet. Preferably, fuser assembly 48 includes a heated fuser roller 50 and a backup roller 52. The toner powder image contacts fuser roller 50. In this manner, the powder image is permanently affixed to the copy sheet.

After fusing, conveyor 54 advances the copy sheet to gate 56. Gate 56 functions as an inverter selecter. Depending upon the position of gate 56, the copy sheet will either be deflected into sheet inverter 58, or bypass inverter 58 and be fed directly onto a second decision gate 60. Those copies which bypass inverter 58 are inverted so that the image side, which has just been transferred and fused, is faceup at this point. However, if inverter path 58 is selected, the opposite is true, i.e. the last printed face is down. Decision gate 60 then either deflects the sheet directly into an output tray 62 or deflects the sheets into a transport path which carries them on without inversion to a third decision gate 64. Gate 64 either passes the copy sheets directly on without inversion into the output path of the printing machine or deflects the sheets into a duplex inverting roller transport 66. Inverting transfer 66 inverts and stacks sheets to be duplexed in duplex tray 68, when required by gate 64. Duplex tray 68 provides buffer storage for those copy sheets which have been printed on one side and on which an image will be printed subsequently on the opposed side thereof. Due to the sheet inverting by roller 66, these copy sheets are stacked in duplex tray 68 facedown. They are stacked in duplex tray 68 on top of one another in the order in which they are initially copied. In order to complete duplex copying, the copy sheets in tray 68 are fed, in seriatim, by bottom feeder 70 back to transfer station D for imaging of the second or opposed side thereof. The duplexed copy sheets are then fed out through the same path through fusing station E past inverter 58 to be stacked in tray 62 for subsequent removal therefrom by the machine operator.

Invariably, after the copy sheet is separated from the photoconductive surface of belt 10 at transfer station D, some residual particles remain adhering thereto. These residual particles are removed from the photoconductive surface at a cleaning station which includes a rotatably mounted fibrous brush in contact with the photoconductive surface. The particles are cleaned from the photoconductive surface by the rotation of the brush in contact therewith. Subsequent to cleaning, a discharge lamp (not shown) floods the photoconductive surface with light to dissipate any residual electrostatic charge remaining thereon prior to the charging thereof for the next successive imaging cycle.

Controller 72 is preferably a programmable microprocessor which controls all of the machine steps and functions heretofore described, including the operation of document handling unit 16, the documents copy sheets, gates, the feeder drives, etc. Controller 100 also provides for storage and comparison of the counts of the copy sheets, the number of documents recirculated in a document set, and the number of copy sets selected by the operator through the switches, time delays, jam correction control, etc. The control of the exemplary sheet handling systems may be accomplished by activating them by signals from controller 72 in response to simple programmed commands from switch inputs from the console button selected by the operator, i.e. selecting the number of copies, simplex or duplex copying, and whether the documents themselves are simplex or duplex. These signals actuate solenoids or cams which control sheet deflector fingers and drive motors or their clutches in the selected steps or sequences programmed. Sheet path sensors or switches may be utilized for counting and keeping track of the position of the documents and the copy sheets. In particular, precollation copying systems utilize microprocessor control circuitry in connecting switches for counting the number of document sheets that are recirculated, counting the number of completed document set circulations, and controlling the operation of the document and copy sheet feeders and inverters. Exemplary control systems for use in electrophotographic printing machines are described in U.S. Pat. No. 4,062,061, issued Dec. 6, 1977 to Batchelor et al., U.S. Pat. No. 4,123,155, issued Oct. 31, 1978 to Hubert, U.S. Pat. No. 4,125,325, issued Nov. 14, 1978 to Batchelor et al., and U.S. Pat. No. 4,144,550, issued Mar. 13, 1979 to Donohue et al., the relevant portions of the foregoing patents being incorporated into the present application.

It is believed that the foregoing description is sufficient for purposes of the present application to illustrate the general operation of an electrophotographic printing machine incorporating the features of the present invention therein.

Figure 2:
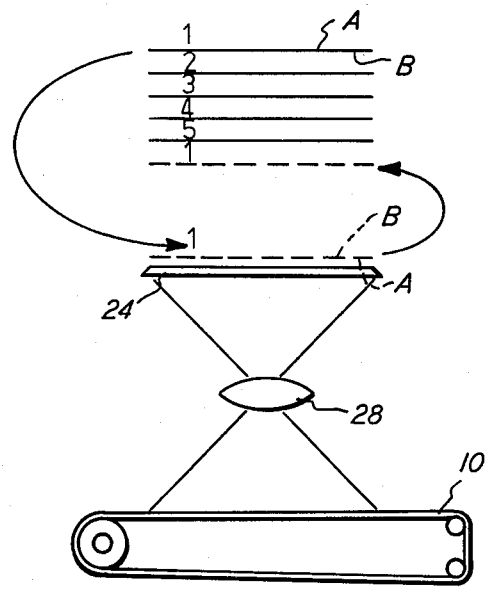
FIG. 2 is a schematic document path for a simplex document.
Figure 3:
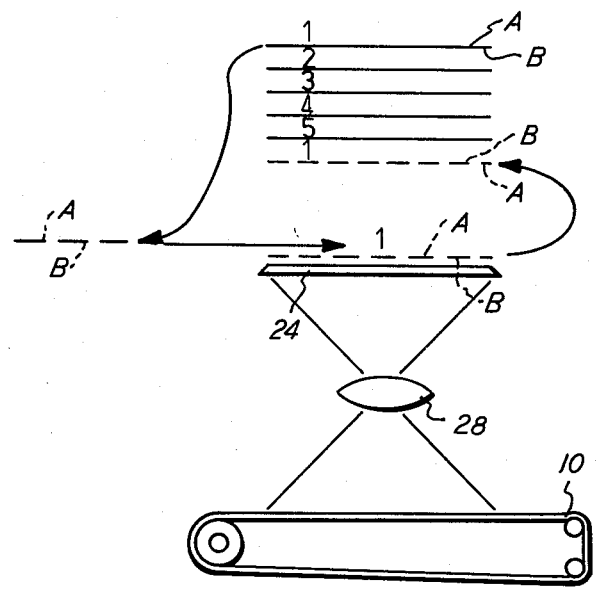
FIG. 3 is a schematic document path for a duplex document.

Referring now to the specific subject matter of the present invention, the general operation of document handling unit 16 is depicted in FIG. 2 in the non-inverting mode and in FIG. 3 in the inverting mode. Turning initially to FIG. 2, a stack of five original documents are shown positioned in the document handling unit. The first original document has side A faceup and side B facedown. Original document 1 is advanced by the document handling unit onto platen 24 with side A facedown and side B faceup. After imaging, the original document is returned to the bottom of the stack of original documents with side A faceup and side B facedown. The foregoing process is repeated until all of the originals documents of the stack have been copied. This is a simplex copying mode of operation. This process may be repeated any number of times to produce a plurality of sets of copies of the set of original documents.

Referring now to FIG. 3, the inverting mode of operation is described thereat. As shown, a stack of five original documents are disposed in the document handling unit. Original document 1 is positioned on top of the stack with side A faceup and side B facedown. Original document 1 is advanced into the inverting chute with side A faceup and side B facedown. Thereafter, original document 1 is advanced from the inverting chute onto platen 24 with side B facedown and side A faceup. After imaging, original document 1 is returned to the bottom of the stack with side B faceup and side A facedown. Thus, if all of the original documents were initially copied as shown in FIG. 2, i.e. the non-inverting mode of operation, and then subsequently copied as shown in FIG. 3, i.e. the inverting mode, the copy sheets would be duplexed.

Figure 4:
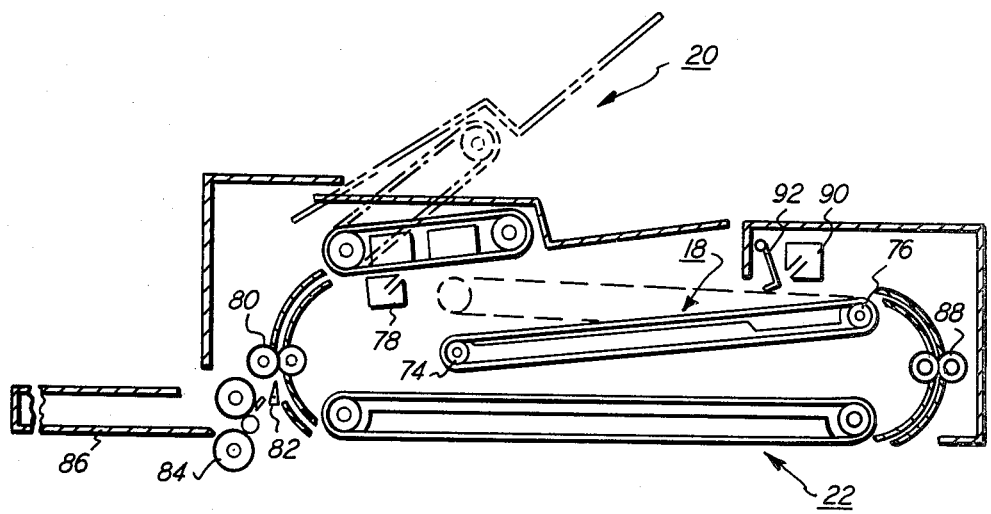
FIG. 4 is a schematic elevational view showing the document handling unit of the FIG. 1 printing machine.

Turning now to FIG. 4, the detailed structure of document handling unit 16 will be described hereinafter. As shown thereat, vacuum belt feeder 20 is mounted pivotably on the frame of document handling unit 16. In this way, vacuum belt feeder 20 is pivotable to a position remote from vacuum belt support system 18. This facilitates loading a stack of documents onto vacuum belt support system 18. After the stack of documents have been loaded on vacuum belt support system 18, vacuum belt feeder 20 is returned to its operative position. In this position, vacuum belt 20 is located closely adjacent to the uppermost sheet of the stack of documents disposed on vacuum belt support system 18. Vacuum belt support system 18 includes a vacuum belt mounted on opposed spaced rollers 74 and 76. As shown, vacuum belt support system 18 is mounted pivotably on document handling unit 16 at one end thereof. A spring pivots vacuum belt system 18 about roller 76 so that successive uppermost sheets of a stack of original documents are positioned closely adjacent to vacuum belt feeder 20. However, one skilled in the art will appreciate that vacuum belt feeder 20 may move to be positioned closely adjacent to the uppermost sheet of the stack rather than pivoting vacuum belt system 18 to achieve the foregoing. Controller 72 actuates vacuum belt feeder 20 and nozzle 78. As vacuum belt feeder 20 advances the uppermost document of the stack of documents on vacuum belt support system 18, nozzle 78 directs the flow of pressurized air onto the underside of the advancing document in the region of the leading marginal portion thereof. This facilitates separation of the uppermost original document from the remainder of the original documents of the stack and insures that the document adheres to vacuum belt feeder 20 for advancement thereby. Forwarding rollers 80 continue to advance the original document along either an inverting or non-inverting path. Deflector gate 82 either directs the document to vacuum belt transport 22 or to forwarding rollers 84. In the inverting mode of operation, the advancing document is directed to forwarding rollers 84 which move it into inverting chute 86. Then, forwarding rollers 84 advance the document from chute 86 to vacuum belt transport 22. In either the inverting or non-inverting mode of operation, vacuum belt transport 22 moves the document onto the platen. After imaging, vacuum belt transport 22 advances the sheet to rollers 88 which, in turn, advance the document to the bottom of the stack of original documents on vacuum belt support 18. Air nozzle 90 operating in conjunction with oscillating lifter 92 enables the advancing sheet to be interposed between the remaining documents of the stack and vacuum belt transport 18. Initially, lifter 92, which is mounted pivotably, lifts the stack of remaining original documents away from vacuum belt support 18. Simultaneously, air nozzle 90 directs a flow of air onto the upper side of the returning original document between the returning original document and the remaining documents of the stack. At this time, lifter 92 pivots to press the returning original document against vacuum belt support 18 so as to facilitate the interposition of the returning original document between the remaining original documents. The detailed manner of operation of lifting mechanism 92 and nozzle 90 are described hereinafter with reference to FIGS. 5 and 6. Vacuum belt 18 has its vacuum inlet located in the region wherein original document 94 passes over roller 76. After the trailing edge of document 94 passes over the vacuum inlet, the vacuum system no longer acts thereon to secure it to the belt. In this way, vacuum belt 18 is a self releasing vacuum belt system. It is thus seen that the original documents are restacked automatically during each circulation from vacuum belt support 18 to platen 24. Document handling unit 16 has conventional switches or other remote sensors for sensing and counting the individual documents fed from vacuum belt support system 18. These sensors count the number of documents circulated. A resettable bale or finger associate with suitable switches or sensors indicates the completion of each circulation of the complet document set. The document handling unit is adapted to serially sequentially feed the documents, which may be various conventional sizes and weights of sheets of paper or plastic containing information to be copied on one or both sides. A top feeder 20 feeds the uppermost document sheet, on demand from the controller, from the stack to one of two select sheet feed paths described heretofore which move the document into a registration position against the registration gate over the printing machine platen. At this time, the side of the document facing the platen is copied. In this document handling unit, each document is selectively inverted or not inverted as it is fed from the vacuum belt support system to the copier platen through one of two paths selected by the controller. Each vacuum belt system, i.e. support system 18, feeder 20 and transport 22, comprise a plurality of belts having apertures therein with a plenum disposed therebehind having a blower disposed therein.

Figures 5, 6:
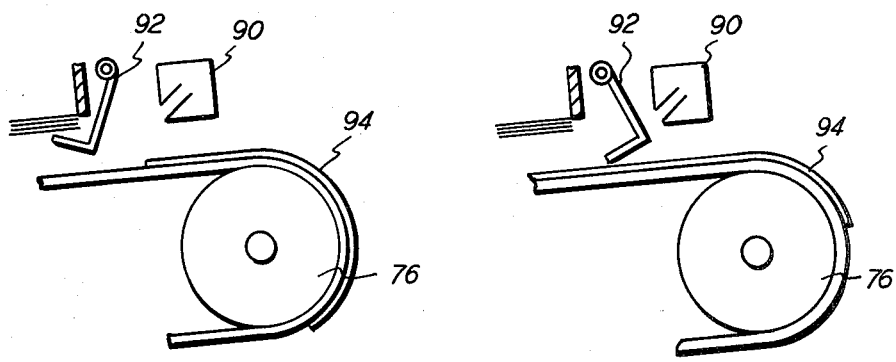
FIG. 5 is a fragmentary, schematic elevational view illustrating a document returning to the bottom of the stack supported in the FIG. 4 document handling system.
FIG. 6 is a fragmentary, elevational view showing the document of FIG. 5 being depressed on returning to the stack.

Turning now to FIG. 5, there is shown nozzle 90 and lifter 92 operating on the leading marginal portion of the returning original document 94. As the original document passes around roller 76 of vacuum belt support 18, nozzle 90 directs the flow of pressurized air onto the leading marginal portion thereof forcing the leading marginal portion in a downwardly direction against the belts of vacuum belt support system 18. Simultaneously therewith, lifter 92 pivots to lift the trailing marginal region of the original documents remaining on vacuum belt support system 18 away therefrom. In this way, a space is defined for the returning original document. The flow of air from nozzle 90 is directed between the uppermost surface of the returning original document 94 and the remaining stacks of original documents to provide lubrication therebetween.

Referring now to FIG. 6, as original document 94 continues to advance, lifting mechanism 92 pivots in a downwardly direction to press the leading marginal portion of the original document against vacuum belt support 18 simultaneously with air nozzle 90 directing a flow of air between the underside of the stack of original documents remaining thereon and the upper surface of returning original document 94. In this way, lubrication is provided between the remaining stack of original documents and returning original document 94. It is thus clear that this lubrication and movement of the lifting mechanism facilitates restacking of successive original documents on the bottom of the stack.

In recapitulation, it is clear that the improved document handling unit of the present invention provides topmost document sheet feeding and bottommost document sheet restacking. The document handling unit advances successive original document, in seriatim, from the top of the stack to the imaging station of an electrophotographic printing machine for subsequent reproduction thereof. After imaging, the original document is returned to the bottom of the stack. The document handling unit provides one of two paths for movement of the original document. One path provides inversion of the original document with the other path providing a non-inverting mode of operation. In this way, simplex or duplex documents may be readily reproduced in a simple manner.

It is, therefore, evident that there has been provided in accordance with the present invention a document handling unit which fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications, and variations as fall within the spirit and broad scope of the appended claims.

What is claimed is:

1. An apparatus for moving documents in a recirculating path from a stack to an imaging station, including:
   means for supporting the stack;
   means for feeding successive uppermost documents from the stack, said feeding means being mounted pivotably to move from an inoperative position remote from said supporting means for changing the stack of documents on said supporting means to an operative position for feeding the uppermost document from the stack, said supporting means being mounted pivotably to position successive uppermost documents adjacent said feeding means with said feeding means being in the operative position;
   means for directing a flow of pressurized air onto the leading marginal region of the uppermost document being fed by said feeding means to facilitate separation of the uppermost document from the remainder of the documents of the stack on said supporting means;
   means for spacing the trailing marginal region of the stack of documents from said supporting means and depressing the leading marginal region of the document being returned to said supporting means beneath the remaining documents thereon; and
   means for transporting documents from said feeding means to the imaging station and returning the documents to the bottom of the stack on said supporting means.

2. An apparatus according to claim 1, further including means for directing a flow of pressurized air between the stack of documents remaining on said supporting means and the document being returned to said supporting means.

3. An apparatus according to claim 2, further including means for inverting a document being fed by said feeding means from said supporting means and advancing the inverted document to said transporting means.

4. An apparatus according to claim 3, wherein said supporting means includes a vacuum belt.

5. An apparatus according to claim 4, wherein said transporting means includes vacuum belt transport means positioned at the imaging station for advancing documents thereto and returning documents to the bottom of the stack on said vacuum belt support means after imaging thereof.

6. An apparatus according to claim 5, wherein said feeding means includes a vacuum belt.

7. A reproducing machine of the type having a platen on which a document is positioned in communication with an optical system for imaging the document through the platen, wherein the improvement includes:
   means for supporting a stack of documents;
   means for feeding successive uppermost documents from the stack, said feeding means being mounted pivotably to move from an inoperative position remote from said supporting means for changing the stack of documents on said supporting means to an operative position for feeding the uppermost document from the stack, said supporting means being mounted pivotably to position successive uppermost documents adjacent said feeding means ith said feeding means being in the operative position;
   means for directing a flow of pressurized air onto the leading marginal region of the uppermost document being fed by said feeding means to facilitate separation of the uppermost document from the remainder of the documents of the stack on said supporting means;
   means for spacing the trailing marginal region of the stack of documents from said supporting means and depressing the leading marginal region of the document being returned to said supporting means beneath the remaining documents thereon; and
   means for transporting documents from said feeding means to the platen and returning the documents to the bottom of the stack on said supporting means after the imaging thereof.

8. A reproducing machine according to claim 7, further including means for directing a flow of pressurized air between the stack of documents remaining on said supporting means and the document being returned to said supporting means.

9. A reproducing machine according to claim 8, further including means for inverting a document being fed by said feeding means from said supporting means and advancing the inverted document to said transporting means.

10. A reproducing machine according to claim 9, wherein said supporting means includes a vacuum belt.

11. A reproducing machine according to claim 10, wherein said transporting means includes vacuum belt transport means positioned at the platen for advancing documents thereto and returning documents to the bottom of the stack on said vacuum belt support means after the imaging thereof.

12. A reproducing machine according to claim 11, wherein said feeding means includes a vacuum belt.

* * * * *